United States Patent [19]

Clark et al.

[11] 4,435,718

[45] Mar. 6, 1984

[54] INK DROP PRINTING SYSTEM

[75] Inventors: Frederic L. Clark, Plano; Orville A. Kaffenberger, Jr.; Suresh C. Paranjpe, both of Dallas; David W. Smith, Richardson; Jack D. Ames, Irving, all of Tex.

[73] Assignee: The Mead Corporation, Dayton, Ohio

[21] Appl. No.: 355,424

[22] Filed: Mar. 8, 1982

[51] Int. Cl.³ ........................ G01D 15/18; B65H 3/30

[52] U.S. Cl. ........................................ 346/75; 271/3.1

[58] Field of Search .................. 346/1.1, 75, 134, 140; 271/3.1

[56] References Cited

U.S. PATENT DOCUMENTS

| | | | |
|---|---|---|---|
| 3,790,703 | 2/1974 | Carley | 346/1.1 X |
| 4,219,822 | 8/1980 | Paranjpe | 346/75 |
| 4,249,187 | 2/1981 | Erikson et al. | 346/75 |
| 4,278,344 | 7/1981 | Sahay | 355/14 SH |
| 4,327,905 | 5/1982 | Schonfeld | 271/3.1 |
| 4,364,057 | 12/1982 | Ebi et al. | 346/140 IJ X |

*Primary Examiner*—Donald A. Griffin

*Attorney, Agent, or Firm*—Biebel, French & Nauman

[57] ABSTRACT

An ink drop printing system for use as part of a duplicator. Sheets which are to be printed by the printing system are fed from one or another of two separate paper supplies and delivered along downwardly converging delivery paths toward a common reception point on a printing transport. The printing transport carries the sheets along a printing path which is angled upwardly and folded back from the delivery paths toward the common reception point. While the sheets are carried upwardly by the printing transport, they are printed by a plurality of inclined, angularly extending, and cooperatively operated jet drop printing heads.

6 Claims, 9 Drawing Figures

INK DROP PRINTING SYSTEM

BACKGROUND OF THE INVENTION

This invention relates to an ink drop printing system which is configured for use as part of a duplicator. Such a duplicator may include an automatic document feeder for feeding original documents to be duplicated, a scanner for scanning documents which are so fed, and a storage device such as a magnetic disk for storing the information which is so scanned. Such a feeding, scanning and storage arrangement may be housed within a single cabinet.

In order to provide high quality printed copies of the original documents, it is necessary to read the stored information from memory and to use that information for controlling some type of dot matrix printer. Ink jet printers are generally suitable for such purposes, but prior art devices for the most part have not been suitable for utilization in a duplicator environment. Examples of typical prior art devices are shown in MacIlvaine U.S. Pat. No. 3,911,818 (forms printer), VanHook U.S. Pat. No. 4,009,332 (copier), Sweet U.S. Pat. No. 3,596,275 (oscillograph), Duffield U.S. Pat. No. 3,787,881 (bar code printer), Carmicheal et al U.S. Pat. No. 3,992,713 (word processor) and Bok et al U.S. Pat. No. 4,283,731 (address printer). Generally speaking, a suitable duplicator should be compact in design, capable of working from a plurality of paper supplies, and possess a relatively unique combination of speed and resolution capabilities; typically a speed of about 120 copies per minute and a resolution of about 350 lines per inch. The above-mentioned ink jet printers do not have such characteristics.

One example of ink jet printing in a duplicator environment is shown in Paranjpe et al U.S. Pat. No. 4,259,696. In a duplicator of that particular type, it is necessary to supply sheets of paper to a printing drum at very high speed and to oscillate the printing head back and forth while the sheets spin around the drum. Such operations require devices which are expensive to produce and prone to mechanical failure.

SUMMARY OF THE INVENTION

According to the present invention, there is provided an ink jet printing system which is fully suitable for printing multiple copies of original documents from stored image information. The printing system includes a plurality of inclined and angularly extending jet drop printing heads, each of which produce a row of drop streams and cooperatively deflect those streams to a plurality of printing positions along a direction perpendicular to the direction of extent of the row. The printing heads cooperatively print images on printing sheets which are transported therebeneath along an inclined path. Printing sheets are supplied from a pair of storage trays to a common reception point on transport means which thereafter carry the sheets along the above-mentioned inclined path. Registration means are provided for registering the edges of the sheets prior to passage beneath the printing heads.

DESCRIPTION OF THE PREFERRED EMBODIMENTS

Figure 1:
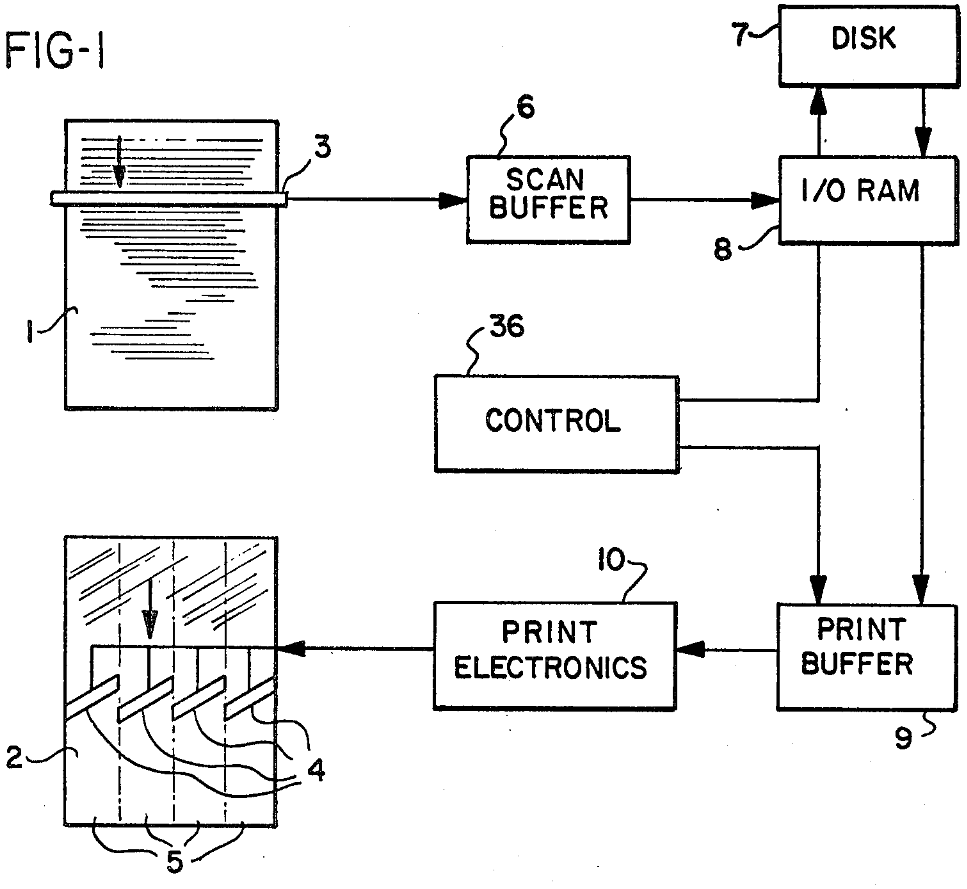
FIG. 1 is a block diagram of an ink drop duplicating system.
Figure 9:
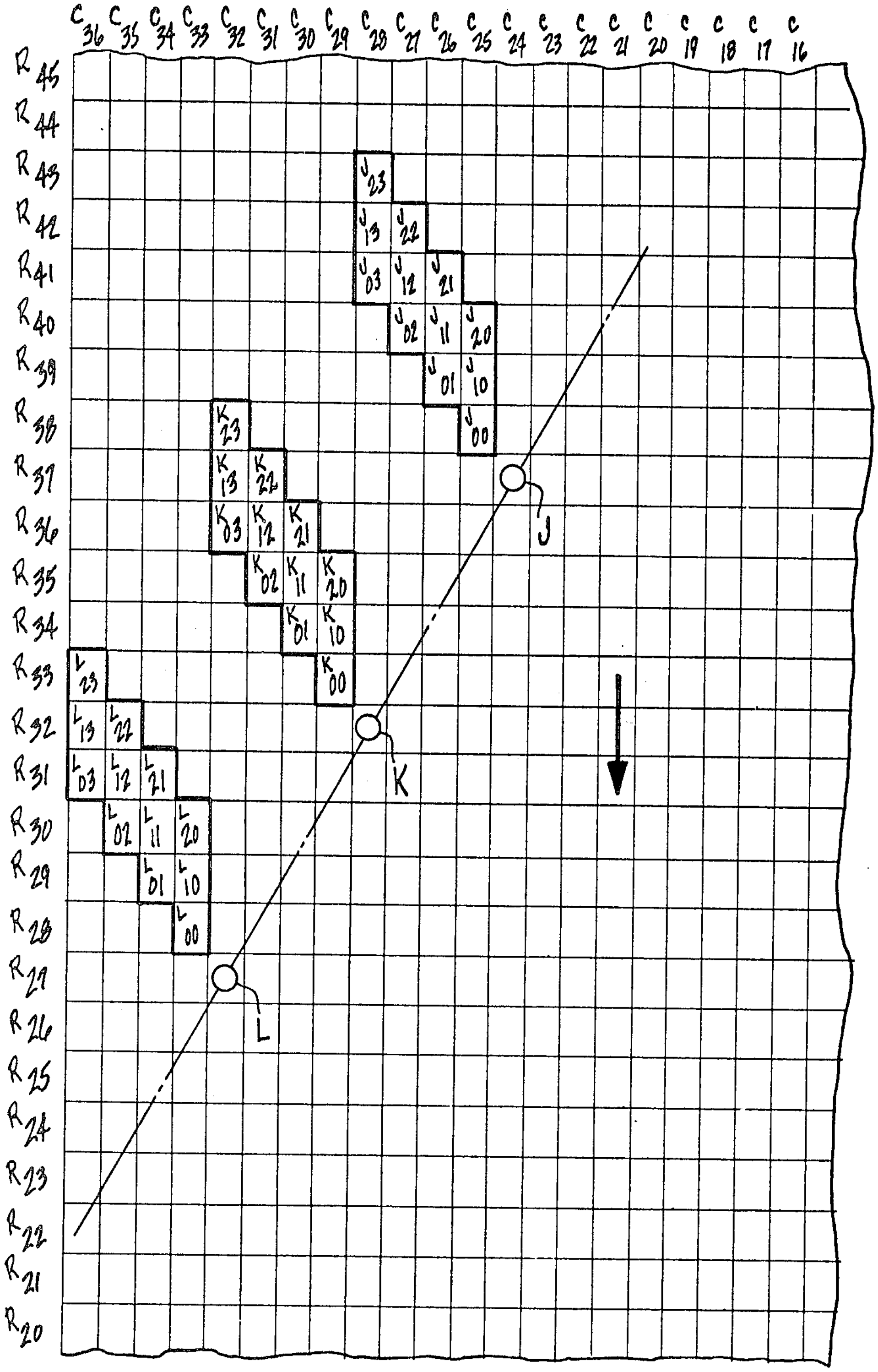
FIG. 9 is a diagrammatic illustration of printing positions as sequentially printed by drops from three adjacent drop streams.

An ink drop duplicating system utilizing the present invention may be configured as generally illustrated in FIG. 1. Thus an original document 1 may be scanned by a laterally extending scanning array 3 for subsequent duplication on a copy sheet 2 by a series of angularly arranged printing heads 4. Each printing head 4 prints within one of a series of contiguous bands 5 collectively covering an area of copy sheet 2 which is to be printed. Printing heads 4 operate under control of printing electronics 10 which generate charging control signals as hereinafter described in response to printing data from print buffer 9. The printing data in print buffer 9 is arranged in a format so as to produce printing as illustrated in FIG. 9.

Scanning signals from scanning array 3 are supplied to scan buffer 6 as a series of analog voltages from each of a series of photosensors comprising scanning array 3. Accordingly scan buffer 6 includes circuitry for digitizing the analog scanning signals. The digitized output indicates a black/white representation for each of the picture elements within a two-dimensional cartesian grid on the face of document 1. If desired, the image data may be filtered by digital filtering techniques for improvement of the image to be reproduced. Also, the image data may be processed in a conventional manner to provide a pseudo gray scale.

After the image data has been appropriately processed, it is stored in scan buffer 6 on a scan line basis. When a complete scan line has been stored, it is transferred to Input-Output RAM 8. After being transferred to I/O RAM 8, the data is formatted and transferred to a magnetic disk 7. The transfer from scan buffer 6 through I/O RM 8 and into disk 7 proceeds under control of control unit 36. It will be noted that the image data is stored on disk 7 in a sequence as generated by scan buffer 6.

After all scanning for a particular printing job (which may include a number of original documents 1) has been completed, output printing begins. At this time the scan data stored on disk 7 is transferred back to I/O RAM 8. Once the data has been returned to I/O RAM 8 it is read out to print buffer 9, under control of control unit 36. Control unit 36 operates in accordance with an algorithm, as hereinafter described, to calculate memory locations within I/O RAM 8 for readout to print buffer 9. The data supplied to print buffer 9 is used for printing control as above described.

Figure 5:
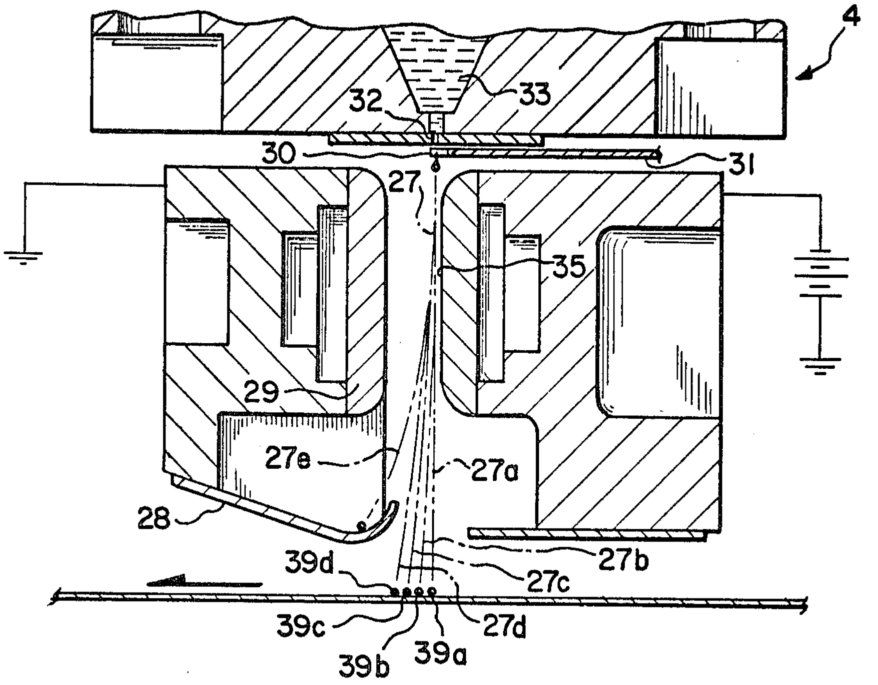
FIG. 5 is a partial cross sectional view of an ink drop printing head for use in practicing the invention.

Each of print heads 4 may be constructed as generally illustrated in FIG. 5. The overall operation of one of print heads 4 is similar to the operation of a print head of the type illustrated in Paranjpe U.S. Pat. No. 4,085,409. A supply of printing ink for carrying out the printing operation is maintained within a manifold 33 and is forced out under pressure through a series of orifices 32 (only one orifice 32 being illustrated in FIG. 5). This causes formation of a series of streams 27, which are caused to break up into uniformly sized and regularly spaced drops under the stimulating action of a stimulation transducer (not illustrated). The break up of streams 27 into drops occurs at charging electrodes 30 which are a series of conductively coated notches along one edge of a charge plate 31. Charge plate 31 is constructed as taught in Culp U.S. Pat. No. 3,618,858.

As drops are formed by drop streams 27, they are selectively charged by charging voltages applied to charging electrodes 30. These charging voltages may have any of five different levels (one of which may be zero), so any drop in one of streams 27 may have any one of five different charging states.

Figure 4:
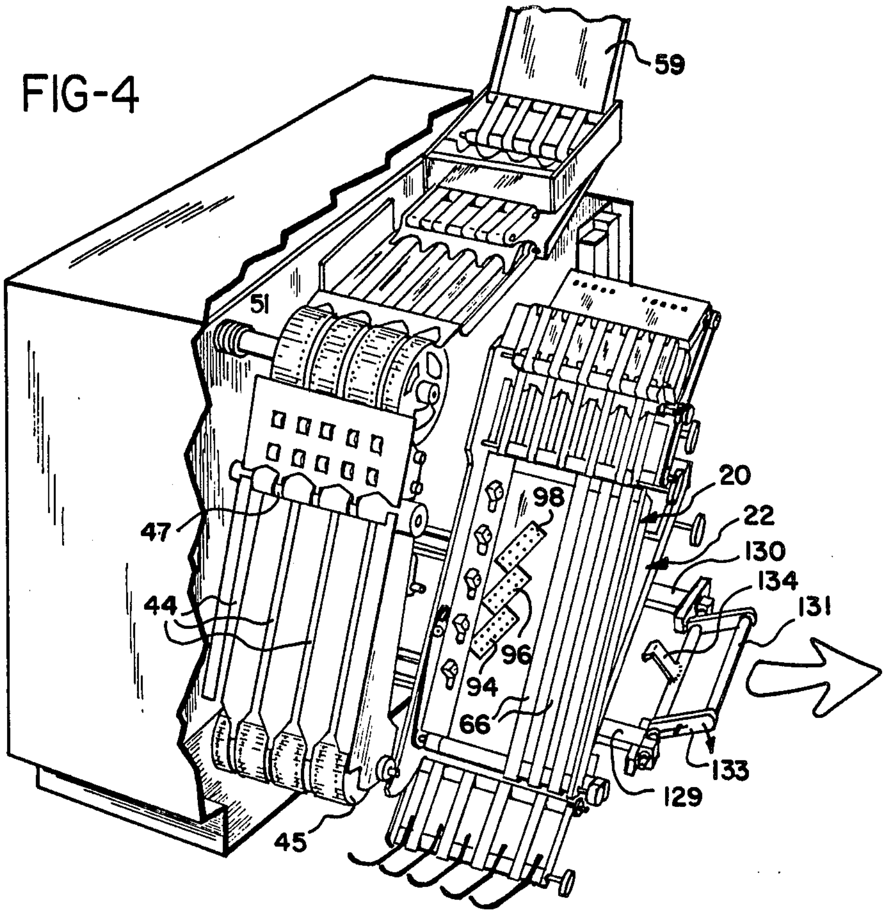
FIG. 4 is a partially cut away pictorial illustration of an ink drop printing system, with registration devices pulled outwardly for servicing.

After the drops are charged as above described, they pass through an electrostatic deflection field established between a pair of deflection electrodes 29 and 35. This causes the drops to be deflected in proportion to their charge level. Thus the drops may be caused to follow any one of five different trajectories 27*a* through 27*e*, as illustrated in FIG. 4. Those of the drops which are highly charged follow the most deflected trajectory 27*e* and caught by a catcher 28. These are non-printing drops. All other drops deposit on copy sheet 2 at printing positions 39*a* through 39*d*.

It will be appreciated that the position of catcher 28 is a matter of convenience and that trajectory 27*e* could be a printing trajectory and trajectory 27*a* a catching trajectory. It will also be appreciated that the drops forming the streams 27 tend to interact with each other. Thus it may be desirable to place compensating voltages on charging electrodes 30 and to place non-printing guard drops between printing drops. Such generation of compensating voltages and the provision of guard drops is well known and need not be discussed here in further detail.

As mentioned above, the printing control information which is stored on disk 7 consists of black/white or print/no-print data. Print electronics 10 must convert such binary data into multi-level charge signals for generation of appropriate charging voltages. This is conveniently accomplished by generating a stairstep control waveform for each control channel and switching the waveform on or off in response to the black/white state of the data read out from print buffer 9. Circuitry for generating such a stairstep waveform is well known and need not be further described. By way of example, such circuitry may function as generally described in Lewis et al U.S. Pat. No. 3,298,030.

Reference will now be made to FIG. 9 for an explanation of the relationship between the coordinate system of scanning array 3 and the coordinate system of print head 4. FIG. 9 illustrates only a portion of one of the printed bands 5. The figure illustrates a rectangular matrix with each cell representing a picture element on either original document 1 or on copy sheet 2. The vertical columns and horizontal rows of the cells are given column numbers and row numbers which uniquely define the position of a cell on the original document and as scanned by scanning array 3. The figure also gives a series of additional designations for certain of the cells as they may be printed by drops from a series of three orifices indicated by the letters J, K and L.

The cell designations in FIG. 9 each consist of an identifying letter (referring to the orifice which prints that cell) and two subscripts. In each case the first subscript refers to an output line number count ($S_1$) and the second subscript refers to a drop count ($S_d$). The drop count, $S_d$, cycles from T-—1 to 0 where T denotes the number of printing positions for each orifice. The output line count, $S_1$, increases progressively from 0 upward, with a new count being added for each new cycle of $S_d$. As shown in FIG. 5, the first cell printed by orifice J is cell $J_{00}$, and this cell is printed simultaneously with the printing of cell $K_{00}$ by orifice K and cell $L_{00}$ by orifice L (assuming that drops of ink are to be deposited at all three cell locations). Thereafter, the three orifices simultaneously print cells $J_{01}$, $K_{01}$ and $L_{01}$, and so on until they print $J_{03}$, $K_{03}$ and $L_{03}$. At this time, the line count is incremented and the orifices begin printing $J_{10}$, $K_{10}$ and $L_{10}$.

It will be seen that cells $J_{00}$ can be designated alternatively as cell $R_{38}$ $C_{25}$, where the first term denotes the row number of the scanned original document, while the second term denotes the corresponding column. The printing control electronics knows the identification of each orifice and also knows the line count and the drop count at all times. This means, in effect, that the printer knows the cell designation for each cell printed. In order to carry out the printing operation, the printer needs to know whether the scannner has generated a "0" or a "1" for that particular cell. The required information is determined by reading the stored contents for the memory row and column which correspond to the known cell identification. The determination of the correct row and column is performed by control unit 36.

The general equations for calculating the row and column numbers are:

$$R=S_d-K_1+S_1-(T+1)n$$

$$C=K_2n+T+b$$

Where:

n=orifice number
b=print head number
$K_1$=row number constant
$K_2$=column number constant In the preferred embodiment, as herein described, there are four printing positions per orifice. For that case the above equations become:

$$R=S_d-K_1+S_1-5n \quad \text{(Equation 1)}$$

$$C=K_2n+T \quad \text{(Equation 2)}$$

Still referring to FIG. 9, it will be seen that the printing control data is arranged in such a manner as to provide printing commands for a row of orifices which simultaneously print within cells having a separation of four columns and five rows. If the columns and rows are equally spaced, then the inclination angle of each of the printing heads is 53.13 degrees. However, there are certain grid matching constraints which restrict the head inclination angle and generally require that the column and row spacing not be quite equal.

Figure 7:
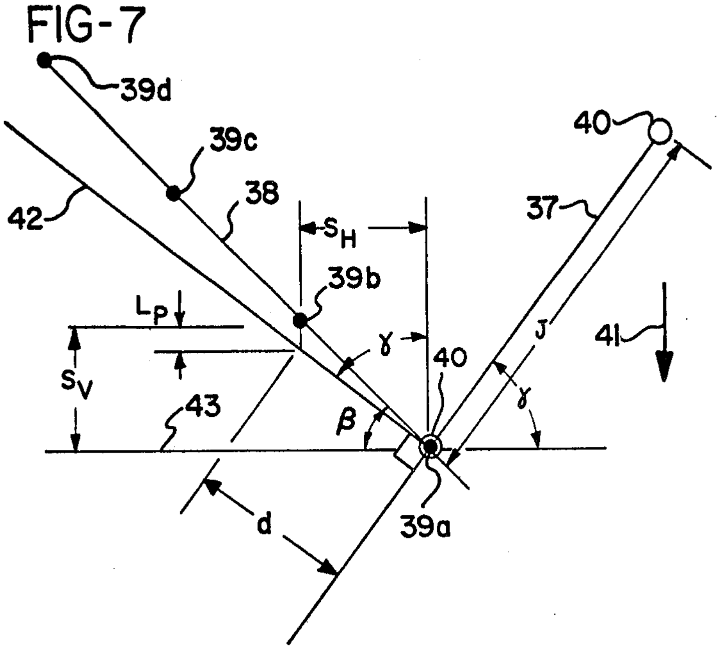
FIG. 7 is a diagrammatic illustration of the relationship between an image bar axis, a drop impact line and a drop trajectory line.
Figure 8:
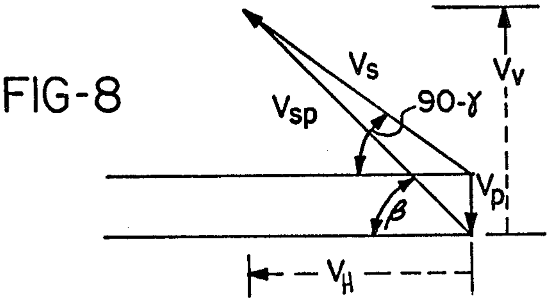
FIG. 8 is a diagram of velocity vectors associated with the geometry of FIG. 7.

The grid matching problem can be understood by referring to FIGS. 7 and 8. FIG. 7 illustrates a line 37 which is parallel to a row of orifices in one of the print heads 4. That line makes an angle $\gamma$ with a reference line 43 parallel to the rows of FIG. 5. The jet stream which is emitted from an orifice 40 is swept along a scan line 42 which is perpendicular to line 37. However, as the jet sweeps, the drops are actually deposited at a series of printing positions 39*a* through 39*d* (centers of drop impact) on the printing surface. These printing positions have a horizontal separation $S_H$ and a vertical separation $S_V$, and the line of printing positions is the line 38. As the jet is printing sequentially at the positions 39*a* through 39*d*, the paper is moving in the direction of the arrow 41. During the time required between prints, the paper moves a distance $L_P$. Thus, scan line 42 does not coincide with print line 38. As shown, line 42 makes an angle $\beta$ with the horizontal reference line.

The vector diagram of FIG. 8 illustrates the relative movement involved during the above discussed jet scanning. For purposes of the illustration, $V_p$ represents the paper movement velocity, $V_s$ represents the jet actual sweep velocity and $V_{sp}$ represents the jet sweep velocity relative to the paper (as seen in a coordinate system which moves with the paper). $V_{sp}$ has a horizontal component $V_H$ and a vertical component $V_V$. The velocity components $V_H$ and $V_V$ are related to the distance $S_H$ and $S_V$ of FIG. 7 by the equations:

$$S_H = \frac{V_H}{f_p} = \frac{V_s \sin\gamma}{f_p} \quad \text{(Equation 3)}$$

$$S_V = \frac{V_V}{f_p} = \frac{V_p + V_s \cos\gamma}{f_p} \quad \text{(Equation 4)}$$

where $f_p$ is the printing frequency (actual drop generation frequency will be higher due to the use of guard drops).

FIG. 7 also illustrates a distance d which is the actual position-to-position drop deflection distance as measured in a non-moving frame of reference. This deflection results from drop charging and deflection and system geometry as illustrated in FIG. 5. Generally speaking, the deflection distance d will be something less than a printed dot diameter so as to provide overlap of printed dots.

The printing frequency $f_p$ of equations (3) and (4) is generally limited by drop stimulation limitations and system data rate limitations. The sweep speed is related to the printing frequency by the equation $$\frac{V_s}{f_p} = d \quad \text{(Equation 5)}$$

If this expression is substituted into equation (3) the print head angle is found to be established by the relation $$\gamma = \sin^{-1}\left(\frac{S_H}{d}\right) \quad \text{(Equation 6)}$$

After the print head angle has been established, the distance J between orifices can be established from the relationship $$J = \frac{MS_H}{\cos\gamma} \quad \text{(Equation 7)}$$

where M denotes the number of print levels per sweep (in this case 4).

The grid matching problem arises by reason of the fact that the rows printed by drops from one orifice must be in registration with rows printed by drops from all other orifices. This means that the grid matching consideration requires that $$J = \frac{GS_V}{\sin\gamma} \quad \text{(Equation 8)}$$

where G is any positive integer.

Thus $$\frac{GS_V}{\sin\gamma} = \frac{MS_H}{\cos\gamma} \quad \text{(Equation 9)}$$

and $$S_V = \frac{MS_H}{G}\tan\gamma \quad \text{(Equation 10)}$$

which constrains the vertical distance between printing rows to one of a discrete number of values in accordance with the selected value of G.

Now by substituting the expression of equation (10) into equation (4) and making other substitutions, $V_p$ is found to be given by the equation:

$$V_p = f_p\left(\frac{J}{G}\sin\gamma - d\cos\gamma\right) \quad \text{(Equation 11)}$$

Thus, the paper movement speed must be set in accordance with equation (11) to produce the row distance $S_V$ as set forth by equation (10). In a typical case the following values may be used:

$S_H = 0.002459$ in.
$f_p = 46.424$ K $H_2$
$d = 0.0031106$ in.
$\gamma = 52.2388$ deg.
$J = 0.016063$ in.
$G = 5$
$S_V = 0.0025398$ in.
$V_p = 29.48$ in./sec.

It will be seen that the scanner must be operated so as to produce the same values of $S_H$ and $S_V$ as are printed by the print heads. Within the scanner, $S_H$ is adjusted by adjusting the spacing of the photosensors in scanning array 3. $S_V$ is adjusted by adjusting the speed of movement of original document 1 and the frequency at which buffer 6 samples the output from scanning array 3.

It will be appreciated that the direction of the sweep $V_s$ may be reversed so that the print head prints marks at printing positions 39*a*–39*d* in the reverse sequence. Such an arrangement causes changes in the print head angle $\gamma$ and other design parameters, but there is no change in the manner of operation.

Figure 2:
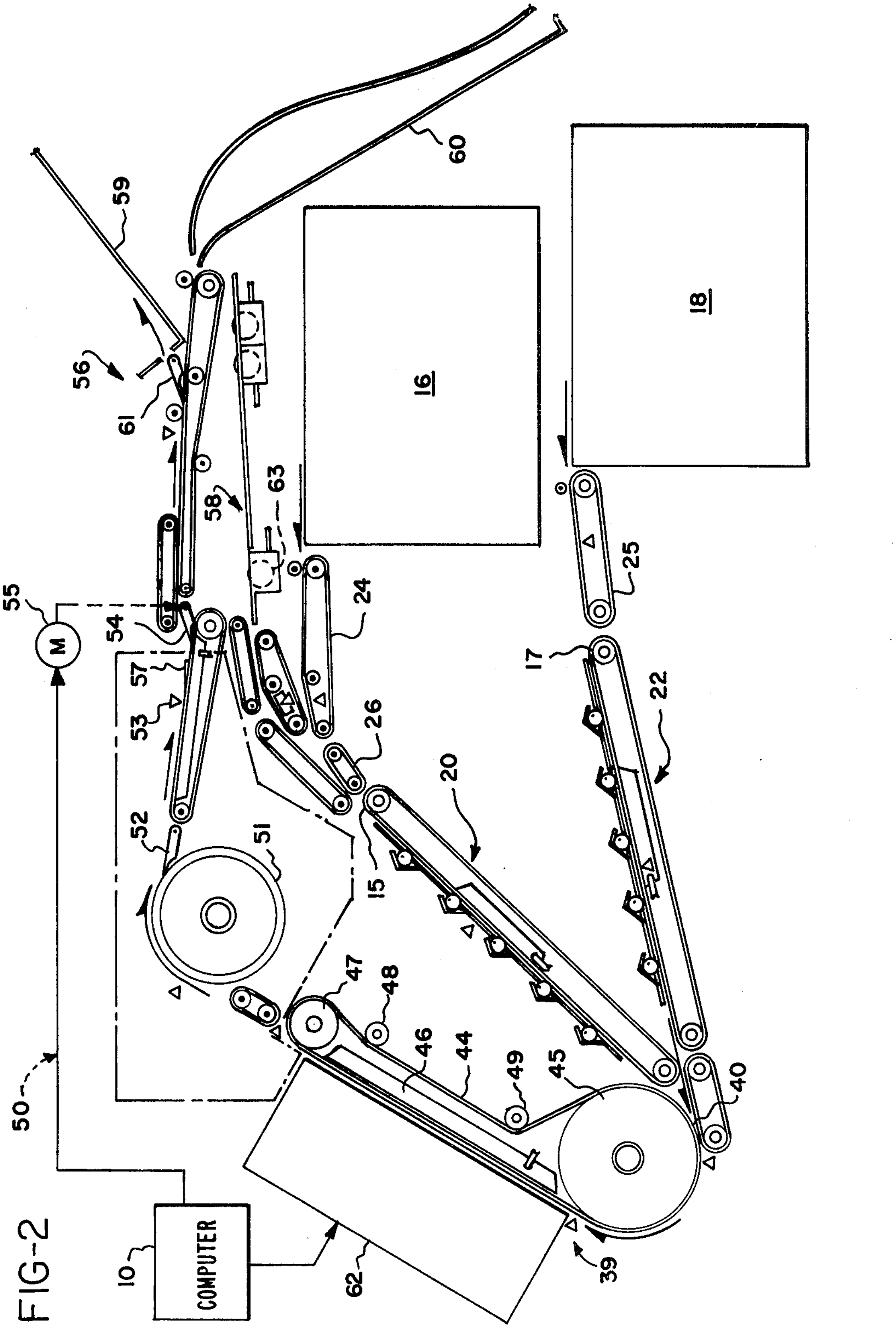
FIG. 2 is a schematic side elevation view of apparatus for handling copy sheets and feeding them to an ink drop printer.

A set of four print heads, angled and spaced as above described, may be incorporated into a print module 62 and upwardly inclined as illustrated in FIG. 2. Copy sheets 2 for printing by the print module 62 may be supplied by one or both of spacer supplies 16 or 18. Sheets of paper from sheet storage tray 16 are supplied to the receiving end 15 of a sheet registration device 20 by belt transports 24 and 26, while sheets from sheet storage tray 18 are transported to the receiving end 17 of a sheet registration device 22 by belt transport 25. The sheets are shifted laterally as they are transported through registration devices 20 and 22, as described more completely below, to provide proper lateral alignment prior to delivery of the sheets to a common receiving point 40 at the lower end of an upwardly inclined transport means 39. Transport means 39 includes a set of vacuum belts 44, a vacuum drum 45, a vacuum plenum 46, a guide roller 47 and backing roller 48 and 49, all arranged as illustrated. Transport means 39 carry the sheets along a path which is preferably inclined upwardly about 60 degrees from the horizontal. The sheets are carried on the belts 44 past print module 62, which includes the four printing heads 4. The path followed by the sheets during printing is folded backwardly from the paths followed during delivery to the common receiving point 40.

After being printed, the sheets are delivered to a drying station 50 and which includes a vacuum drum 51. The sheets are stripped from the drum 51 by gate 51 and delivered to a transport 53. A pair of ramps 57 (only one illustrated) strip the printed sheets from transport 53 and direct them toward an inverting tray 58. There is a gate 54 which may be selectively operated by a motor 55 to direct the sheets to an output transport 56. Transport 56 carries the sheets to an output sample tray 59 or alternatively, to an accumulator tray 60. Gate 61 deflects the sheets into tray 52, when pivoted into the position shown in FIG. 1. Those sheets which are delivered to inverting tray 58 are directed toward registration device 20, which returns the sheets to printing transport 39 for reverse side printing. A vacuum roller 63 is provided for removing sheets from inverting tray 58 and directing them toward registration device 20.

Figure 3:
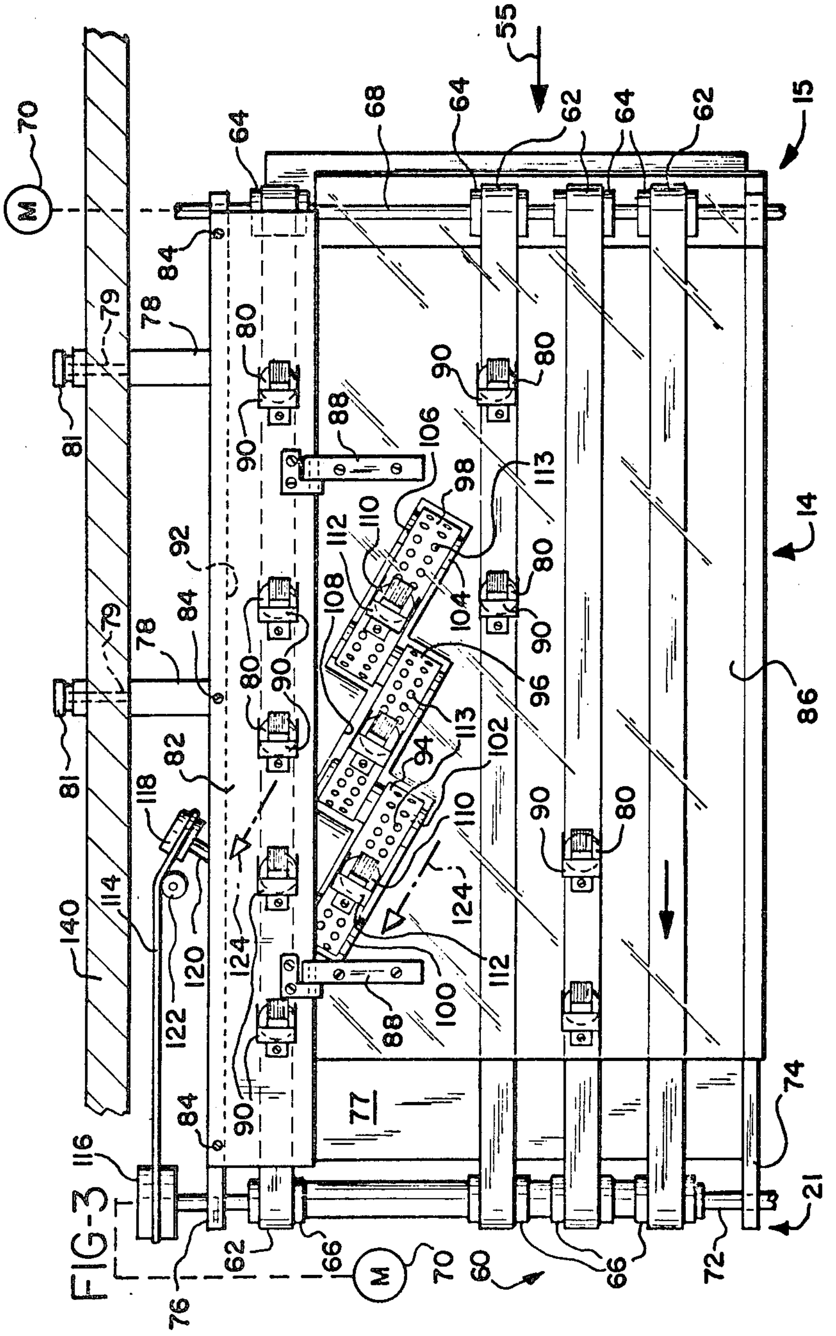
FIG. 3 illustrates sheet registration apparatus.

FIG. 3 illustrates the sheet registration device 20 in greater detail, it being understood that sheet registration device 22 is of substantially similar design and operation. As shown in FIG. 3, printing sheets are received from a belt transport at a location and from a direction indicated by arrow 64. The sheets are delivered to a sheet output, indicated generally at 65, and properly aligned laterally with their side edges parallel to the direction of sheet movement.

Printing sheets are transported through sheet registration device 20 by means of an endless belt conveyor means, including a plurality of endless belts 66. Belts 66 extend around pulleys 67 and 68. Pulleys 67 are mounted on shaft 69 which is drivingly connected to motor 70. Pulleys 68 are mounted on shaft 72. Shafts 69 and 72 are rotatably supported in end frames 74 and 76 so as to permit free rotation of the shafts 69 and 72. Belts 66 extend across the top of a sheet support plate 72 which is attached to end frames 74 and 76.

Supporting rods 78 are attached to end frame 76 and extend away from registration device 20. A screw 79 extends from each rod 78 and a threaded cap 81 is fitted upon each screw 79, to provide means for mounting registration device 20 to the printing device.

In order to ensure that the sheets are firmly engaged by belts 66, the conveyor means further includes a plurality of spherical rollers 80 which rest on the belts 66 and contact the sheets therebetween. The weight of the rollers 80 presses the sheets downward against the belts 66.

A means for retaining the spherical rollers 80 in position above the endless belts includes a plate 82, secured to end frame 76 by screws 84, and a cover plate 86 which is attached to plate 82 by means of hinges 88. For purposes of illustration, cover plate 86 is shown as transparent. Plate 82 and cover plate 86 define circular openings in which rollers 80 are positioned. The circular openings are slightly smaller in diameter than the spherical rollers 80.

Rollers 80 are free to rotate in any direction by virtue of retainers 90 which are attached to plate 82 and cover plate 86. Each of the retainers 90 permits a roller 80 to rest on a sheet therebeneath and to rotate freely with the sheet as it moves in any direction.

End frame 76, as well as providing support for the shafts 69 and 72, also defines an alignment surface 92 which extends generally parallel to and to one side of belts 66. An alignment means includes a plurality of parallel vacuum belts 94, 96 and 98. Belts 94, 96 and 98 are mounted on rollers 100, 102, 104 and 106 and extend upward through an opening 108 in plate 77 such that the top surfaces of the belts 94, 96 and 98 are substantially level with the top surfaces of belts 66. Vacuum belts 94, 96 and 98 are skewed with respect to endless belts 66 and preferably form an angle of approximately 30° therewith. The alignment means further include spherical rollers 110 which are held in position in openings in cover plate 86 by retainers 112.

Each of the vacuum belts 94, 96 and 98 defines a plurality of openings 113 through which a partial vacuum is applied to a sheet supported thereon. The number, size and spacing of openings 113 are all selected to produce the optimum vacuum conditions for sheets of the size which are to be printed by the printer.

Means for driving the vacuum belts 94, 96 and 98 include a belt 114 which extends between pulley 116, mounted on shaft 72, and pulley 118, mounted on shaft 120. Shaft 120 is connected to roller 100. As motor 70 drives endless belts 66 shaft 72 is rotated. Pulley 116 rotates and drives pulley 118 via belt 114 which extends around portions of idler pulleys 122, the upper of which is shown in FIG. 3. Belt roller 100 is rotated and drives belt 94, which in turn rotates roller 102, driving belt 96. In like manner, roller 104, driven by belt 96, drives belt 98. The sizes of pulleys 116 and 118 and rollers 100, 102 and 104 are selected such that the surface velocity of belts 95, 96 and 98 is greater than the surface velocity of belts 66.

The operation of the sheet registration device 20 is described below. A sheet enters sheet registration device 20 from the location and in the direction indicated by arrow 65. The sheet is transported along sheet support plate 77 by belts 66, and is held in contact therewith by spherical rollers 80. As the sheet is advanced by belts 66, it contacts, in turn, vacuum belts 98, 96 and 94, and is held in contact therewith by both spherical rollers 110 and the partial vacuum applied to the sheet through openings 113 in belts 98, 96 and 94.

During contact of the sheet with belts 98, 96 and 94, the movement thereof urges the sheet in a direction indicated by arrows 124. At the same time, the sheet is being carried forward by belts 66 so that the sheet is moved generally through sheet registration device 20, but the lateral edge of the sheet is also being moved into contact with registration surface 92. Belts 98, 96 and 94 continue to move the sheet laterally until the sheet edge is fully against registration surface 92, so that when the sheet is delivered by belts 66 to sheet output 65, the sheet has been properly aligned for printing.

In order to provide access to the interior of the apparatus for servicing or jam clearance registration devices 20 and 22 are supported upon a pair of sliding members 129 and 130 as illustrated in FIG. 4. A handle assembly including a handle 131 is provided for pulling the registration devices out to the illustrated position. Handle 131 is mounted on a shaft 132 and biased upwardly into a latching position by a spring 133. A latch 134 is provided for latching the apparatus in the closed or fully retracted position.

Figure 6:
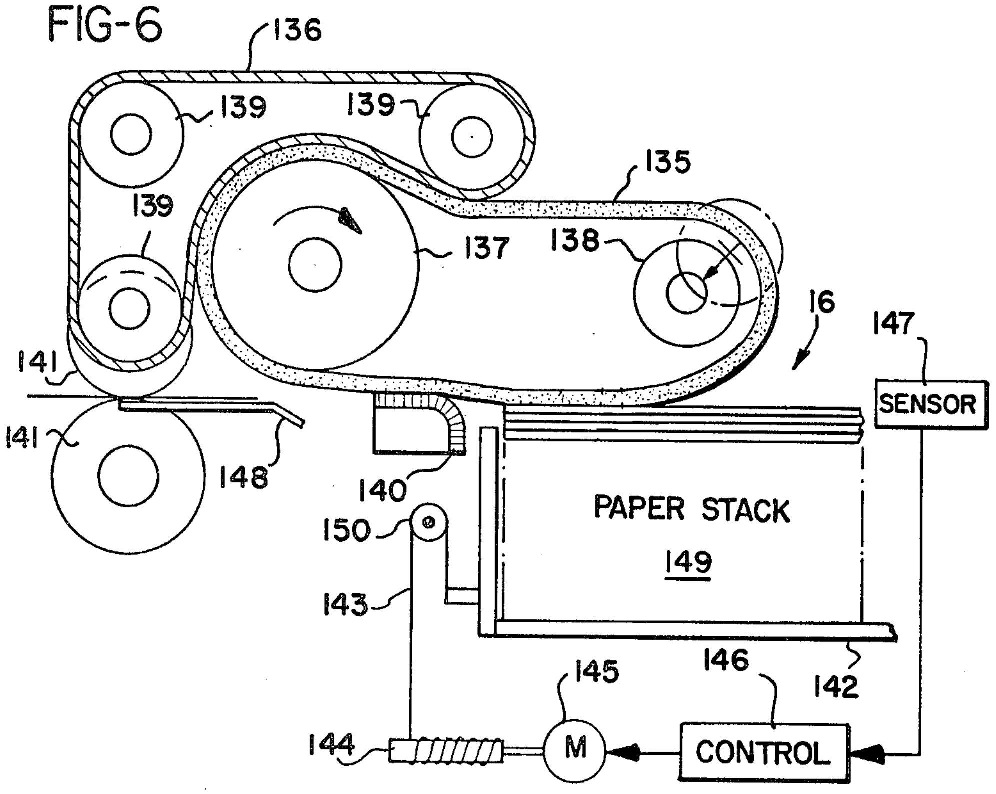
FIG. 6 is a schematic illustration of sheet feeding apparatus.

FIG. 6 illustrates a preferred form of feeder for feeding sheets of paper from paper supply 16 (a similar feeder also being used with paper supply 18). The feeder utilizes a floating feed belt 135 which rests on top of a stack of sheets 149 within paper supply 16. Feed belt 135 is driven by a drive wheel 137 and is held in contact therewith by a backing belt 136. Backing belt 135 rides around a set of idler wheels 139.

Frictional forces sufficient for feeding sheets of paper from stack 149 are produced by the cantilevered weight of belt 135. Sheets which are so fed are carried against a retard member for separation from any lower sheets which might accidently be fed therewith from the top of stack 149. The sheets are then delivered to a receiving surface 148 and from there into the nip of a pair of pinch rollers 141. When feeding is to be terminated, belt 135 is lifted from contact with the top of stack 149 by raising a control wheel 138 from a non-functioning position to a belt supporting position as indicated by phantom lines in FIG. 6.

It will be appreciated that the paper feeder of FIG. 6 requires means for progressively raising paper stack 149 to keep the top sheet thereof in contact with the lower surface of feed belt 135. Suitable apparatus therefor is illustrated schematically as including a level sensor 147, a control unit 146, a drive motor 145, a drive shaft 144 and a cable 143. Cable 143 passes around a pulley 150 for attachment to platform 142. Platform 142 supports stack 149.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink drop printing system comprising:

a pair of storage trays for storing separate supplies of printing sheets, feed means for feeding said printing sheets from said storage trays, sheet delivery means for receiving said sheets from said feed means and delivering said sheets along generally converging delivery paths toward a common reception point, transport means for transporting said printing sheets along a printing path which is folded backwardly and upwardly from said common reception point, at least one inclined and angularly extending jet drop printing head supported adjacent said transport means for progressively printing said sheets as they are transported therepast, sheet registraton means for registering the edges of said sheets prior to passage beneath said printing head, and inverting means for receiving printed sheets from said transport means, inverting said sheets, and delivering said sheets to said sheet delivery means for redelivery to said transport means and printing on the reverse sides thereof.

2. Apparatus according to claim 1 wherein said storage trays are positioned at different elevations and said sheet delivery means comprises a pair of belt transports which converge angularly downward from said storage trays toward said common reception point.

3. Apparatus according to claim 2 wherein said sheet registration means comprises means for completing said registration while said sheets are traveling along said belt transports.

4. Apparatus according to claim 3 wherein said printing path is angled upwardly at an angle of about 60 degrees from the horizontal.

5. Apparatus according to claim 1 wherein said jet drop printing head comprises means for generating an inclined and angularly extending row of drop streams, deflecting means for deflecting selected ones of the drops comprising said streams in a direction perpendicular to the direction of extent of said row so as to deposit upon said printing sheets at predetermined angularly extending printing positions, drop control means responsive to a series of drop commands for selecting those of said drops which are to be so deposited, and catching means extending parallel to the direction of extent of said row for catching those of said drops which are not so selected.

6. Apparatus according to claim 5 wherein said ink drop printing system comprises a plurality of said inclined and angularly extending jet drop printing heads arranged for printing a plurality of contiguous bands on said sheets.

* * * * *